April 19, 1927.  F. W. PICHE  1,625,150
BRAKE MECHANISM
Filed March 5, 1925   2 Sheets-Sheet 1

INVENTOR.
Frank W. Piche
BY
his ATTORNEY

April 19, 1927.
F. W. PICHÉ
1,625,150
BRAKE MECHANISM
Filed March 5, 1925      2 Sheets-Sheet 2
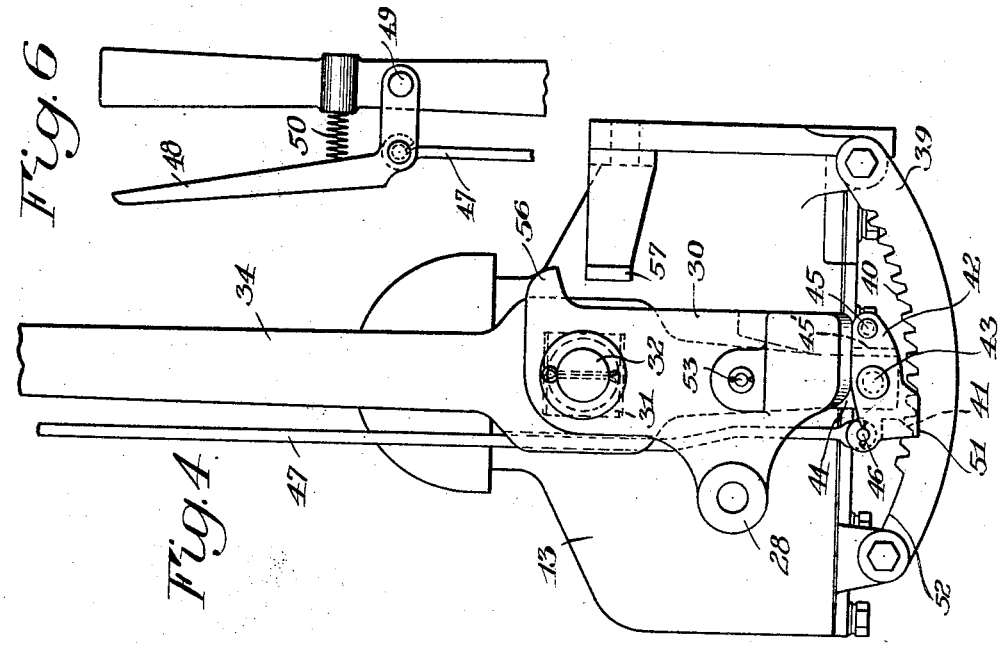
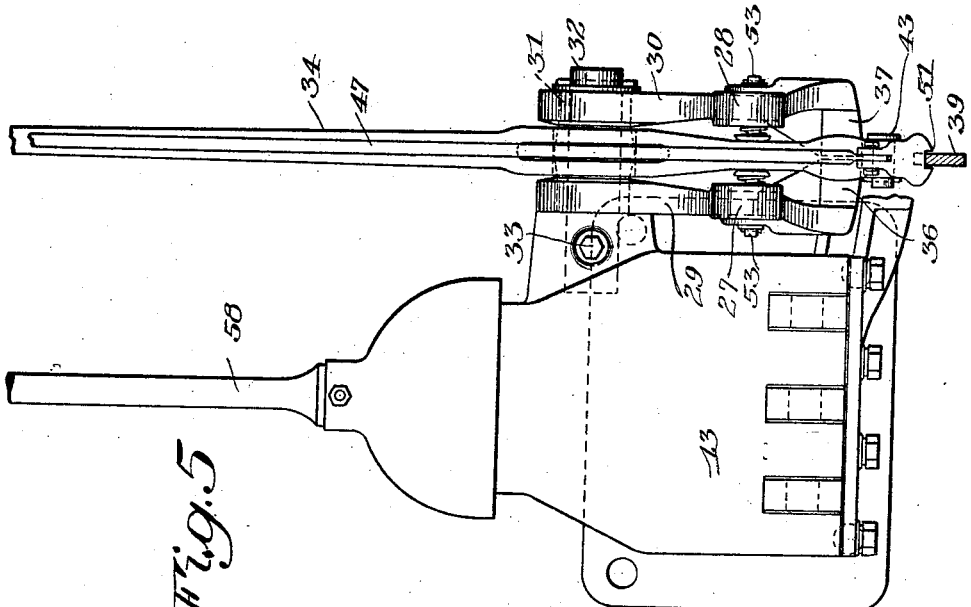
INVENTOR.
Frank W. Piché
BY
his ATTORNEY Patented Apr. 19, 1927.

1,625,150

UNITED STATES PATENT OFFICE.

FRANK W. PICHÉ, OF DETROIT, MICHIGAN.

BRAKE MECHANISM.

Application filed March 5, 1925. Serial No. 13,060.

The present invention relates to brake mechanism and has for its object to provide an improved selective brake control mechanism for the tractive members of a motor vehicle, where individual braking of the different tractive wheels or members may be required under certain conditions of service.

The invention further has for its object to provide in combination with a motor vehicle brake of the selective type improved means for preventing the locking of either brake in service position while the other is in release position.

The invention also has for its object to provide a simple, practical and comparatively inexpensive brake mechanism of the selective type for braking the tractive wheels of a motor vehicle, either simultaneously, as in controlling the speed of the vehicle, or for independent operation of the brakes for the purpose of braking one wheel at a time, as when one of the wheels has lost its effective tractive engagement with the ground.

To these and other ends the invention resides in certain improvements and combinations of parts, all as will be hereinafter more fully described, the novel features being pointed out in the claims at the end of the specification.

In the drawings:

Figure 4 is a side elevation similar to Figure 2 showing the operating lever in position to effect application of both brakes at the same time;

Figure 5 is a rear elevation of the brake control shown in Figure 4 with the ratchet bar shown in section, and Figure 6 is a side elevation illustrating the upper end of the brake operating lever.

Similar reference numerals throughout the several views indicate the same parts.

In the present invention I provide an improved motor vehicle brake of the selective type including an operating or control member adapted for selective movement and operation in two different planes to effect separate and individual operation of the brakes, and for movement in a third plane to effect simultaneous operation of both brakes with locking means for the operating member so constructed that it will, though held in release position, prevent movement of the operating lever in any but the plane selected while moving to service position, or after movement from a predetermined point at which the selection is to be made. The design is such that the locking means must be in release position during individual operation and therefore it is impossible to lock either brake in service position while the other is in release position.

Figure 1:
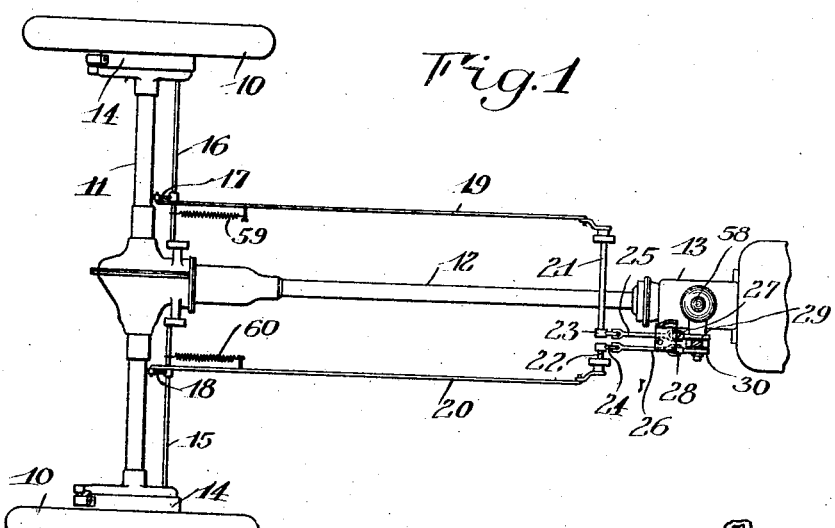
Figure 1 is a top plan view of a portion of a motor vehicle chassis in connection with which the present invention is illustrated diagrammatically.
Figure 3:
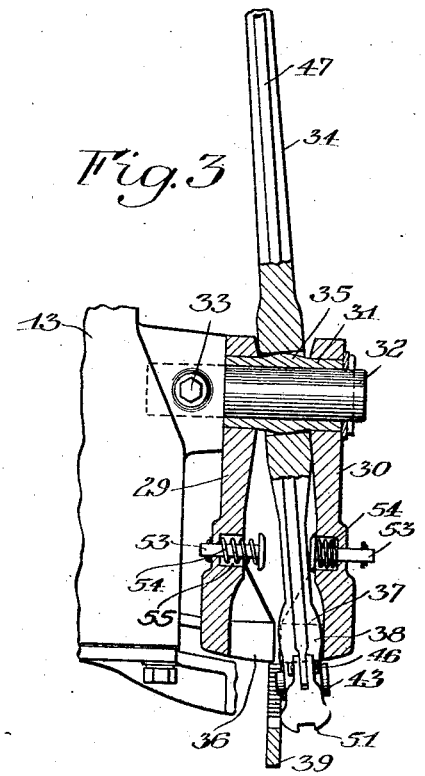
Figure 3 is a sectional elevation taken on line 3ª—3ª of Figure 2.

In Figure 1 I have shown the rear wheels 10 of a motor vehicle, the differential driving axle 11, torque tube 12, transmission casing cover 13, and rear brakes indicated generally at 14. The present invention is particularly applicable to the internal or emergency brakes of the vehicle though not necessarily limited to this class of brakes. The invention is employed in connection with the usual transversely extending brake shafts 15 and 16 which are adapted to operate the internal brakes and which are provided with arms 17 and 18, respectively, with which the forwardly extending brake rods 19 and 20 are connected. The front end of the rod 19 is suitably connected with a transverse shaft 21 and the rod 20 with another transverse shaft 22. The shafts 21 and 22 are provided with arms 23 and 24, respectively, from which extend the relatively short pull rods 25 and 26. The pull rods are suitably connected to the lateral extensions 27 and 28 of a pair of spaced brake actuating arms or levers 29 and 30 which are pivoted upon and depend from a bearing block 31 carried by a pivot pin or bolt 32 projecting from one side of the transmission casing cover 13, the bolt being removably secured thereon in any suitable manner and held by means of a stud bolt 33, as shown in Figure 3. A brake operating or control lever 34 is disposed between the depending brake actuating arms 29 and 30, and is adapted both for a pivotal and a rocking movement upon the central portion 35 of the bearing block 31 which is tapered or cone shaped at both sides of its center in order to permit shifting of the lever to any one of its three operating planes as will be pointed out hereinafter. The arms or brake actuating levers 29 and 30 are provided at their lower ends and at their forward edges with inwardly projecting lugs 36 and 37, respectively, which lie in the path of the lower end portion 38 of the operating lever so that both lugs may be simultaneously engaged by said lever portion or either one engaged thereby without the other, depending upon whether it is desired to actuate both brakes at the same time, or to operate one independently of the other.

Figure 2:
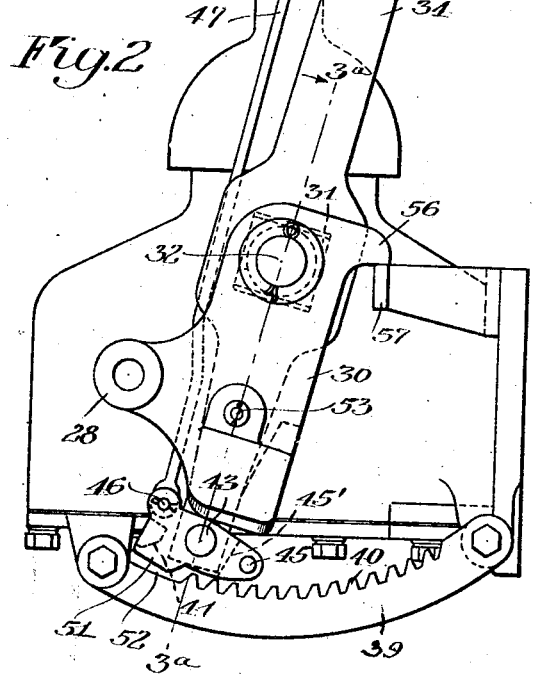
Figure 2 is a fragmentary side elevation illustrating the improved brake control mechanism with the operating lever shown in normal release position.

The locking mechanism for the operating lever preferably includes a ratchet bar 39 suitably supported at the lower end of the lever and having upwardly projecting teeth 40 for engagement with the latch portion 41 of a pawl 42. The pawl is preferably in the form of a yoke which is pivoted at 43 to the reduced portion 44 of the lever 34. The sides of the yoke are preferably connected integrally at one end by the beveled latch portion 41 and at the other end by a bolt or rivet 45 extending through a filler block 45' disposed between said ends. Pivotally connected with the rear end of the pawl at 46 is a control rod 47 extending upwardly to a point adjacent the top of the lever 34 where it is connected with a hand grip 48 pivoted upon the lever at 49, a spring 50 being adapted to urge the rod downwardly in order to maintain the pawl in locking engagement with latch bar 39. The pawl is provided at its rear end with downwardly extending lugs 51 on its opposite sides which project slightly below the upper extremities of the teeth 40 when the pawl is raised the maximum amount whereby shifting of the lever from one plane of operation to another is prevented, except when the lever is in the normal brake release position shown in Figure 2 which is the only position from which selection can be made, or, in other words, the only position at which lateral shifting of the lever from one plane of operation to another is permitted. Selection at this point is made possible by omitting the teeth from the rear end portion 52 of the ratchet bar so that the projections 51 of the pawl, when the latter is raised as shown in Figure 2, can swing clear of the bar. In this predetermined selective position, the lever 34 will be held perpendicular to its pivotal axis by a pair of spring pressed plungers 53, slidably mounted upon the brake actuating arms or levers 29 and 30, and urged toward each other by the springs 54 disposed in pockets 55 of said arms as shown in Figure 3. When the hand lever 34 is returned from either of its individual operating positions to the position shown in Figure 2 and released by the operator one or the other of the plungers 53 will automatically move it back to vertical position. From this normal and predetermined position selection is made and if it is desired to apply both brakes simultaneously no lateral shifting of the lever is required, but only a straight rearward pull on the upper end thereof is necessary, because in this position the lower portion 38 of the lever is in contact with the lugs 36 and 37 of the arms 29 and 30, and equal pressure will be exerted upon both to move them forwardly while they in turn operate the pull rods 25 and 26 to apply both brakes at the same time. Having selected to apply both brakes simultaneously and having advanced the lower end of the lever until the projections 51 of the pawl are opposite the teeth of the segment 39 no lateral shifting of the lever can take place because said projections will strike the teeth and prevent any change in the vertical position of the lever. It will be seen, therefore, that the lever must be brought back to the position shown in Figure 2 before it can be moved out of the vertical plane, but from this position, however, it can be shifted to the right or left as desired and then operated in either of two planes inclined to the axis of the pivot 32, depending upon which brake it is desired to operate. Movement of the lever directly from either inclined operating position to the other is prevented by engagement of one or the other of the projections 51 of the pawl with the teeth of the ratchet bar, and since in either inclined operating position the latch portion 41 of the pawl cannot be made to engage the teeth of the ratchet bar neither brake can be locked in service position while the other is in release position. Thus, it will be seen that the relatively movable parts of the locking mechanism, such as the pawl and the ratchet bar, cooperate during operation of the brakes to prevent movement of the operating member in any but the plane selected, although the locking means remains in release position, both during individual and simultaneous operation.

The brake release springs, 59 and 60, by the pull which they exert on the rods 19 and 25 in the one case, and the rods 20 and 26 in the other, serve normally to maintain the lugs 56 of the brake actuating members 29 and 30 in contact with the stop bracket 57 as shown in Figure 2 and said actuating members serve in turn to hold the operating lever in the position shown in this figure.

While the brake lever 34 and other parts of the mechanism are shown supported by the transmission casing cover adjacent the gear shift lever 58, it will be understood that although this particular location is a convenient and desirable one for certain types of motor vehicles it may be advantageous to change the location in other types of vehicles, which can be readily done without departing from the spirit of the invention as expressed in the claims.

In the operation of the brake mechanism, assuming that it is desired to effect application of the right hand brake only as viewed in Figure 1, the operator will lift the pawl 42 from the position shown in Figure 4 and move the lever 34 until the pawl reaches a position over the reduced end 52 of the ratchet bar 39 as shown in Figure 2. The lever can then be inclined to the position shown in Figure 3 so that its lower end will lie on the right side of the ratchet bar in position to engage the lug 37 of the arm 30 and with the lever in this position a rearward pull on its upper end will exert a pull on the brake rod 20 and apply the right hand brake. Upon release of the brake the lever must be moved back to the position shown in Figure 2 before returning it to normal position. The operation of applying the left hand brake is the same as that described above except that the lever 34 will be inclined in the opposite direction for this operation. In the normal operation of applying both brakes at the same time the lever 34 is operated in the plane indicated in Figure 5 after release of the pawl 42.

I claim as my invention:

1. The combination with a vehicle frame having a plurality of traction members and a brake for each of the members including different actuating devices therefor, an operating member for said actuating devices movable in different planes from a predetermined point to operate said actuating devices one independently of the other and locking means for the operating member adapted while released to prevent movement of the operating member from one of said planes to another except when at said predetermined point.

2. The combination with a vehicle frame having a plurality of traction members, and a brake for each of the members including different actuating devices therefor and release means for the brakes, an operating member for said actuating devices having different planes of operation for the different devices and locking means for said operating member adapted while in release position to permit movement of the operating member from a predetermined point to either plane of operation and preventing its movement from one plane to another after being moved from said point.

3. The combination with a vehicle frame having a plurality of traction members and a brake for each of the members including different actuating devices therefor and release means for the brakes, an operating member for said actuating devices movable to different service positions to effect independent operation of said actuating members, and locking means for the operating member including relatively movable parts adapted to cooperate while in release position to prevent direct movement of the operating member from one service position to another.

4. The combination with a vehicle frame having a plurality of traction members and a brake for each of the members including different actuating devices therefor, an operating member for said actuating devices movable from a predetermined point to different service positions whereby to effect either simultaneous or independent operation of said actuating members, and locking means for the operating member including relatively movable parts cooperating when the locking means is in release position to prevent movement of the operating member from one service position to another before returning to said predetermined point.

5. The combination with a vehicle frame having a plurality of traction members and a brake for each of the members, including separate actuating devices therefor, an operating member for said actuating devices movable from a predetermined point to different service positions whereby to effect either simultaneous or independent operation of said actuating members, and locking means for the operating member including relatively movable parts one of which is adapted when the locking means is in release position to engage another to prevent movement of the operating member from one independent operating position to another before returning to said predetermined point.

6. The combination with a vehicle frame having a plurality of differentially driven wheels and a brake for each of the wheels, an operating member movable in different planes for cooperation with said brakes to effect independent operation of each and locking means for the operating member including relatively movable parts adapted to permit movement of the operating member from one plane to another when at a predetermined point and cooperating while in release position to prevent movement from one of said planes to another except when at said predetermined point.

7. The combination with a vehicle frame having a plurality of traction wheels and a brake for each of the wheels, a plurality of pivoted actuating devices having a common pivotal axis, said devices being operatively connected with said brakes, and an operating member pivotally disposed for movement about said axis and movable in different planes to independently engage and operate said devices to effect independent operation of the brakes.

8. The combination with a vehicle frame having a plurality of traction wheels and a brake for each of the wheels, a plurality of pivoted actuating devices having a common pivotal axis, said devices being operatively connected with said brakes, and an operating member pivotally disposed for movement about said axis and movable in different planes to independently engage and operate said devices to effect independent operation of the brakes, said operating member being also movable to effect simultaneous operation of said devices whereby to apply said brakes at the same time.

9. The combination with a vehicle frame having a plurality of traction wheels and a brake for each of said wheels, a fixed support carried by the frame, a pair of arms depending from said support and each being free to swing thereon, means operatively connecting said arms with said brakes and a lever pivoted upon said support between the arms adapted in one position to engage and move both arms and being shiftable to different inclined positions to independently engage and operate said arms.

10. The combination with a vehicle frame having a plurality of traction wheels and a brake for each of said wheels, a fixed support carried by the frame, a pair of arms depending from said support and each being free to swing thereon, means operatively connecting said arms with said brakes, a lever pivoted upon said support between the arms adapted in one position to engage and move both arms and being shiftable to different inclined positions to independently engage and operate said arms, and means tending to return the lever to the first mentioned position when moved to either of said inclined positions.

11. The combination with a vehicle frame having a plurality of traction wheels and brakes for the same, a plurality of pivoted brake actuating devices, an operating member arranged to normally occupy substantially a central position between said devices and being adapted for movement in different inclined planes to effect separate operation of the brakes and means tending to urge the operating member back to said central position when moved therefrom.

12. The combination with a vehicle frame having a plurality of traction wheels and brakes therefor, a plurality of pivoted brake actuating devices, an operating member arranged to normally occupy substantially a central position between said devices, and being adapted for movement in different planes to effect either simultaneous or separate operation of said brakes, and yieldable means tending to urge the operating member back to central position when moved therefrom.

13. The combination with a vehicle frame having a plurality of traction wheels and brakes for each of the wheels, a plurality of pivoted brake actuating devices, an operating member arranged to normally occupy substantially a central position between said devices, and being adapted for movement in different planes to effect separate operation of said brakes, and yieldable means carried by said devices tending to urge the operating member back to said central position when moved therefrom.

14. The combination with a vehicle frame having a plurality of traction wheels and brakes for each of the wheels, a plurality of vertically disposed members operatively connected with said brakes and having a common pivotal axis, a brake operating lever pivotally disposed between said members and adapted for movement in different planes to separately engage and operate the members, and locking means for the operating lever disposed beneath said pivotal members, and including relative movable parts, one of which is carried by the lever.

15. The combination with a vehicle frame having a plurality of traction wheels and a brake for each of the wheels, a plurality of vertically disposed members pivoted at their upper ends, operating connections for said brakes connected with said vertically disposed members intermediate their ends, and an operating member adjustable to engage the lower end of either of the vertically disposed members to effect independent operation of the brakes.

16. The combination with a vehicle frame having a plurality of traction wheels and a brake for each of the wheels, a plurality of vertically disposed members pivoted at their upper ends, operating connections for the brakes engaging the vertically disposed members intermediate their ends, an operating lever pivotally disposed between said members and adapted for movement in different planes to effect independent operation of each brake or simultaneous operation of all, and means at the lower end of the lever for holding it against movement in different planes except at a predetermined position of the lever.

17. The combination with a vehicle frame having a plurality of traction wheels and a brake for each of the wheels, a plurality of vertically disposed members pivoted at their upper ends, operating connections for the brakes engaging the vertically disposed members intermediate their ends, an operating lever pivotally disposed between said members, and adapted to cooperate with their lower ends to effect independent operation of each brake, or simultaneous operation of all, locking means for the operating lever positioned beneath said vertically disposed members, and a release member for the locking means located above said members.

18. The combination with a vehicle frame having a plurality of traction wheels and brakes therefor, a support, a pair of pivoted brake operating members depending from the support, brake actuating members connected with said operating members intermediate their ends, lugs carried by the lower ends of said brake operating members, and a lever disposed between said operating members and movable for independent or simultaneous engagement with the lugs to effect separate or simultaneous operation of said brakes.

19. The combination with a vehicle frame having a plurality of traction wheels and brakes therefor, a pivotal support, a pair of levers depending from the support and connected intermediate their ends with said brakes, and a manually controlled operating member adapted to simultaneously engage the lower ends of said members to effect operation of the brakes at the same time, or to separately engage the same to effect independent operation of the brakes.

20. The combination with a vehicle frame having a plurality of traction wheels and brakes for the same, a pivotal support, a pair of levers pivoted upon and depending from the support and connected intermediate their ends with said brakes, and an operating lever pivotally disposed upon the support between said depending levers and adapted for movement to selectively engage their lower ends to effect either independent or simultaneous operation of the brakes.

21. The combination with a vehicle frame having a plurality of traction wheels and brakes for the same, a pivotal support, a pair of levers pivoted upon and depending from the support and connected intermediate their ends with said brakes, an operating lever pivotally disposed upon the support between said depending levers and adapted for movement to selectively engage their lower ends to effect either independent or simultaneous operation of the brakes, and locking means for the operating lever disposed adjacent the bottom thereof and operable from a point above said depending means.

22. The combination with a vehicle frame having a plurality of traction wheels and brakes therefor, a pivotal support, a pair of levers depending from the support and connected intermediate their ends with said brakes, an operating lever disposed upon the support between said depending levers and adapted both for a pivotal and a lateral rocking movement and arranged to simultaneously or independently engage the lower ends of the depending levers to effect independent or simultaneous operation of the brakes, spring pressed plungers carried by said depending levers on opposite sides of the operating lever to normally maintain the latter in a central position between said depending levers, a ratchet bar disposed beneath said levers, a pawl pivotally disposed upon the operating lever and having projections adapted to prevent locking of the lever in either of its independent operating positions by engagement with the ratchet bar, and an operating member for the pawl operable from a point above said depending levers.

23. The combination with a vehicle frame having a plurality of traction wheels and brakes for the same, a transmission casing, a pivotal support carried by the casing, a pair of levers pivoted upon and depending from the support, and operatively connected with said brakes, and an operating lever pivotally disposed upon the support between said depending levers, and adapted to separately engage and operate the same, and to effect simultaneous operation of both.

24. The combination with a vehicle frame having a plurality of traction wheels and brakes for the same, a pivotal support mounted adjacent the center of the frame, a pair of levers pivoted upon and depending from the support and operatively connected with said brakes, and an operating lever pivotally disposed upon the support between said depending levers, and adapted for separate engagement with the lower ends of the latter to effect independent operation of each.

FRANK W. PICHÉ.